United States Patent
Guo

(10) Patent No.: US 11,483,263 B2
(45) Date of Patent: Oct. 25, 2022

(54) METHOD AND TERMINAL FOR FACILITATING CHAT BETWEEN USERS OF TWO TERMINALS

(71) Applicant: BEIJING DAJIA INTERNET INFORMATION TECHNOLOGY CO., LTD., Beijing (CN)

(72) Inventor: Shaoze Guo, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/202,932

(22) Filed: Mar. 16, 2021

(65) Prior Publication Data

US 2021/0203626 A1 Jul. 1, 2021

Related U.S. Application Data

(63) Continuation of application No. PCT/CN2019/100883, filed on Aug. 15, 2019.

(30) Foreign Application Priority Data

Oct. 17, 2018 (CN) .......................... 201811211143.1

(51) Int. Cl.
*H04L 51/04* (2022.01)
*H04L 51/046* (2022.01)
(Continued)

(52) U.S. Cl.
CPC ........ *H04L 51/046* (2013.01); *G06F 16/9035* (2019.01); *G06F 16/9535* (2019.01); *H04L 51/216* (2022.05)

(58) Field of Classification Search
CPC . G06F 16/9035; G06F 16/9535; H04L 51/04; H04L 51/046; H04L 51/14;
(Continued)

(56) References Cited

U.S. PATENT DOCUMENTS

2003/0225833 A1* 12/2003 Pilat ..................... G06Q 10/107
709/204
2010/0228777 A1* 9/2010 Imig .................. G06F 16/9535
707/E17.108

(Continued)

FOREIGN PATENT DOCUMENTS

| CN | 105550231 A | 5/2016 |
| CN | 105959208 A | 9/2016 |

(Continued)

OTHER PUBLICATIONS

The State Intellectual Property Office of People's Republic of China, First Office Action in Patent Application No. 201811211143.1 dated Aug. 5, 2019, which is a foreign counterpart application corresponding to this U.S. Patent Application, to which this application claims priority.

(Continued)

*Primary Examiner* — Le H Luu
(74) *Attorney, Agent, or Firm* — Kolitch Romano LLP

(57) ABSTRACT

A method for processing information can include acquiring a chat scenario of a first terminal and a second terminal; determining a chat topic for the first terminal and the second terminal according to the chat scenario; and determining a first question and first question options according to the chat topic, wherein the first question is sent by the first terminal; sending the first question and the first question options to the first terminal and the second terminal; and displaying the first question and the question options on the first terminal and the second terminal, respectively.

19 Claims, 9 Drawing Sheets

(51) Int. Cl.
  *G06F 16/9035* (2019.01)
  *G06F 16/9535* (2019.01)
  *H04L 51/216* (2022.01)

(58) Field of Classification Search
  CPC ..... H04L 51/16; H04L 51/32; H04L 51/3329; H04L 51/02; H04L 67/02; G06N 5/022; G06Q 10/00; G06Q 10/107; G06Q 30/0241; H04M 3/5183
  See application file for complete search history.

(56) References Cited

U.S. PATENT DOCUMENTS

| | | | |
|---|---|---|---|
| 2015/0088998 A1 | 3/2015 | Isensee et al. | |
| 2015/0261867 A1 | 9/2015 | Singal et al. | |
| 2017/0048170 A1* | 2/2017 | Smullen | H04L 67/02 |
| 2017/0154495 A1* | 6/2017 | Sri | G06Q 30/0241 |
| 2018/0033042 A1* | 2/2018 | Wang | H04L 51/046 |
| 2018/0196796 A1* | 7/2018 | Wu | G06N 5/022 |
| 2019/0007228 A1* | 1/2019 | Vuskovic | G06Q 10/00 |
| 2019/0058793 A1* | 2/2019 | Konig | H04M 3/5183 |
| 2019/0297031 A1* | 9/2019 | Basheer | H04L 51/02 |
| 2020/0044996 A1* | 2/2020 | Johnson | H04L 51/046 |
| 2021/0203623 A1* | 7/2021 | Zhou | G06F 16/3329 |

FOREIGN PATENT DOCUMENTS

| | | |
|---|---|---|
| CN | 105978792 A | 9/2016 |
| CN | 106649404 A | 5/2017 |
| CN | 106649405 A | 5/2017 |
| CN | 106656732 A | 5/2017 |
| CN | 107273487 A | 10/2017 |
| CN | 107562724 A | 1/2018 |
| CN | 108000526 A | 5/2018 |
| CN | 108255999 A | 7/2018 |
| CN | 109547323 A | 3/2019 |

OTHER PUBLICATIONS

Notification to grant patent right for invention of Chinese application No. 201811211143.1 dated Oct. 14, 2019.
International Search Report of the International Searching Authority for State Intellectual Property Office of the People's Republic of China in PCT application No. PCT/CN2019/100883 dated Nov. 15, 2019, which is an International application corresponding to this U.S. application.

* cited by examiner

METHOD AND TERMINAL FOR FACILITATING CHAT BETWEEN USERS OF TWO TERMINALS

CROSS-REFERENCE TO RELATED APPLICATIONS

This application is a continuation application of international application No. PCT/CN2019/100883, filed on Aug. 15, 2019, which claims priority to Chinese Patent Application No. 201811211143.1, filed on Oct. 17, 2018. Both applications are incorporated herein by reference.

TECHNICAL FIELD

The present disclosure relates to the field of network communication technologies, and in particular relates to a method and a terminal for processing information.

BACKGROUND

In the field of Internet social contact, chatting is one of the most important ways of interaction between users. How to enable two parties to start chatting and to chat smoothly on a computer terminal or a mobile terminal has always been a difficult problem in the field of Internet social contact.

SUMMARY

The present disclosure provides a method and a terminal for processing information.

In one aspect of embodiments of the present disclosure, a method for processing information is provided. The method includes:

acquiring a chat scenario of a first terminal and a second terminal upon setup of a chat session between the first terminal and the second terminal;

determining a chat topic for the first terminal and the second terminal according to the chat scenario; and determining a first question and first question options according to the chat topic, wherein the first question is sent by the first terminal to the second terminal; and sending the first question and the first question options to the first terminal and the second terminal, wherein the first question options are configured to be selected by the second terminal and returned to the first terminal.

In another aspect of embodiments of the present disclosure, a method for processing information is provided. The method includes:

receiving a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal; and displaying the first question on a chat session page in the form of a chat message, and displaying the first question options in corresponding locations, wherein the first question options are configured to be selected by the second terminal and returned to the first terminal.

In still another aspect of embodiments of the present disclosure, a terminal is provided. The terminal includes:

a processor; and a memory configured to store an instruction executable by the processor;

wherein the processor is configured to:

receive a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal; and display the first question on a chat session page in the form of a chat message, and display the first question options in corresponding locations, wherein the first question options are configured to be selected by the second terminal and returned to the first terminal.

It should be understood that both the foregoing general description and the following detailed description are only exemplary and explanatory and are not restrictive of the present disclosure.

BRIEF DESCRIPTION OF DRAWINGS

The accompanying drawings, which are incorporated in and constitute part of this description, illustrate embodiments consistent with the present disclosure and, together with the description, serve to explain the principles of the present disclosure.

DESCRIPTION OF EMBODIMENTS

Reference now are made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
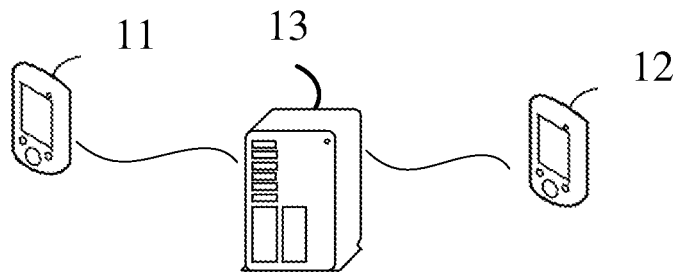
FIG. 1 is a schematic diagram of an implementing environment according to an embodiment of the present disclosure.

FIG. 1 is a schematic diagram of an implementing environment according to an embodiment of the present disclosure. As shown in FIG. 1, the implementing environment includes a first terminal 11, a second terminal 12 and a server 13. The first terminal 11 and the server 13 are connected to each other via wired or wireless network, and the second terminal 12 and the server 13 are connected to each other via wired or wireless network.

The first terminal 11 and the second terminal 12 enable the user of the first terminal and the user of the second terminal to chat with each other, and the server 13 is configured to provide a chat service for the first terminal 11 and the second terminal 12. The first terminal 11 and the second terminal 12 may be a computer, a mobile phone, a tablet computer or other terminal. The server 13 is a single server, or a server cluster composed of several servers, or a cloud computing service center.

In some embodiments, a target application is installed on each of the first terminal 11 and the second terminal 12; the first terminal 11 and the second terminal 12 chat with each other through the respective target application, and the server 13 provides services for the target application.

The implementing environment shown in FIG. 1 includes a first terminal 11 and a second terminal 12. In some embodiments, if the first terminal 11 and the second terminal 12 are two of the terminals in a group chat session, the implementing environment further includes other terminals participating in the group chat, such as a third terminal, a fourth terminal.

Figure 2:
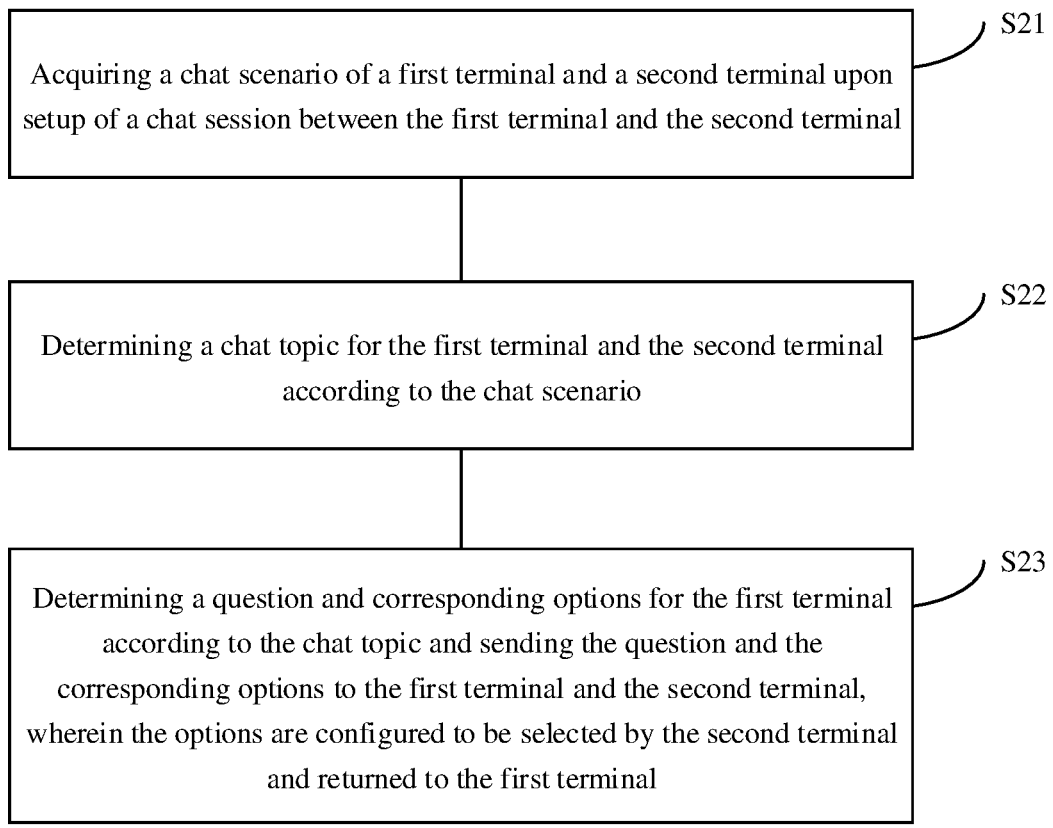
FIG. 2 is a flowchart of a method for processing information according to an embodiment of the present disclosure.

FIG. 2 is a flowchart of a method for processing information according to an embodiment of the present disclosure. As shown in FIG. 2, the method for processing information is applied to a server, and includes steps S21-S23.

In S21, a chat scenario of a first terminal and a second terminal is acquired upon setup of a chat session between the first terminal and the second terminal.

The chat session is a two-person session or a group chat session. The first terminal and the second terminal are two parties of the chat session. The first terminal is a terminal that is to send a chat message by a user to the other party, the second terminal is a terminal that is to receive the chat message from the first terminal. The second terminal is one terminal used by one user in a two-person chat session, or includes multiple terminals used by multiple users in a group chat session. That is, one terminal sending a chat message and one or more terminals receiving the chat message are included in the chat session.

In some embodiments, the chat scenario is determined according to the frequency of chats between the first terminal and the second terminal, for example, the chat scenario is classified into a first chat and a non-first chat according to whether the first terminal and the second terminal are chatting for the first time. Alternatively, the chat scenario is determined in other ways, for example, according to the location of the first terminal or the second terminal.

In some embodiments, the first terminal or the second terminal is any of the terminals in the chat session. The first terminal is a sender of a chat message, and the second terminal is a receiver of the chat message. Alternatively, the first terminal is a receiver of a chat message, and the second terminal is a sender of the chat message.

Upon setup of the chat session between the first terminal and the second terminal, the server acquires attribute information that may determine the chat scenario of the two parties according to attributes for determining the chat scenario, and determines the chat scenario of the first terminal and the second terminal according to the acquired attribute information. The attributes are used to determine the chat scenario, for example, the attributes include chat messages, geographic locations, and so on; and the attribute information includes information such as the chat history of the first terminal and the second terminal, the information on the geographic locations of the first terminal and the second terminal. For example, if the chat scenario to be determined is whether the two parties are chatting for the first time, the server can acquire a chat history of the two parties, and determine whether the two parties are chatting for the first time according to the chat history. That is, the chat scenario is the first chat if there is no chat history between the two parties, and the chat scenario is not the first chat if there is the chat history between the two parties. The two parties refer to any two of the terminals in the chat session.

In S22, a chat topic for the first terminal and the second terminal is determined according to the chat scenario.

The chat topic includes a plurality of questions and options corresponding to each of the plurality of questions. The options refer to alternative reply messages given to one question, there are at least two options to that question. For example, the chat topic includes a question, and the options that are the answers to the question or another question asked for the question. The options for each question are different expressions for the same meaning, or completely different answers. For example, the question is "Can I ask you a question", and the options given to that question are "Okay, go ahead" and "Say as if I said no, you will not ask, go ahead", both the answers given by the two options are yes.

The server can establish a corresponding relationship between the chat scenario and the chat topic in advance, and query the pre-established corresponding relationship after the chat scenario of the first terminal and the second terminal is acquired, and determine the chat topic corresponding to the acquired chat scenario as the chat topic for the first terminal and the second terminal. The corresponding relationship includes the chat scenario and at least one corresponding chat topic, and a corresponding relationship may be established between the same one chat topic and different chat scenarios.

In S23, a question and corresponding options for the first terminal are determined according to the chat topic and sent to the first terminal and the second terminal, wherein the options are configured to be selected by the second terminal and returned to the first terminal.

The question for the first terminal is a first question, and the first question is sent by the first terminal to the second terminal, and the options corresponding to the first question are first question options.

In some embodiments, the first terminal is a terminal that sends a chat message and the second terminal is a terminal that receives the chat message. The server randomly selects one question and corresponding options from the chat topic as the first question and the first question options for the first terminal, and sends the first question and the first question options to the first terminal, the first question and the first question options is displayed on the first terminal. And at the same time, the server sends the first question and the first question options to the second terminal, and the first question and the first question options are displayed on the second terminal to allow a user who uses the second terminal to select the corresponding first question options, and the first question options selected by the user of the second terminal are returned to the first terminal.

In some embodiments, determining the chat topic for the first terminal and the second terminal according to the chat scenario includes:

determining a chat topic for the first terminal and the second terminal as a start topic if the chat scenario is the first chat between two parties; and determining a chat topic for the first terminal and the second terminal according to user characteristic information of the second terminal or user characteristic information of the first terminal and the second terminal if the chat scenario is not the first chat between two parties.

The start topic is a chat topic set in advance for users who are chatting for the first time, making it easier for the two parties to find the chat topic even if they are unfamiliar with each other, such that the two parties can get to know each other quickly. For example, the start topic includes hometown, interest and hobby, and so on. The user characteristic information is at least one of users' behavior information (e.g., historical usage behavior), location information, personality information, age information, gender information, etc.

The server provides different chat topics according to whether the chat scenario is the first chat between the first terminal and the second terminal. If the chat scenario is the first chat between the first terminal and the second terminal, the server determines that the chat topic for the first terminal and the second terminal is the start topic. If the chat scenario is the first chat between the first terminal and the second terminal, the chat can become easier after the first terminal and the second terminal have answered the start question. If the chat scenario is not the first chat between the first terminal and the second terminal, the server determines the chat topic for the first terminal and the second terminal according to the user characteristic information of the second terminal, or according to the user characteristic information of the first terminal and the user characteristic information of the second terminal. In this way, the two parties can find it is easy to talk based on the chat topic determined by the server so as to attract the user of the second terminal. The two parties refer to the first terminal and the second terminal.

In some embodiments, determining the chat topic for the first terminal and the second terminal according to the user characteristic information of the first terminal and the user characteristic information of the second terminal includes:

determining a common area of concern of the first terminal and the second terminal according to the user characteristic information of the first terminal and the user characteristic information of the second terminal; and matching the topic related to the common area of concern as a chat topic for the first terminal and the second terminal, that is, generating the chat topic for the first terminal and the second terminal according to the common area of concern.

The topic is a topic pre-stored in a question library, or a topic composed and saved in advance by the first terminal, or a set of topics in the question library and topics composed by user terminals. The common area of concern is the category of topics of common concern, and the same one area of concern includes at least one topic.

In some embodiments, the user characteristic information of the first terminal and the user characteristic information of the second terminal are acquired and matched, the common area of concern of the first terminal and the second terminal is determined, wherein the topic related to the common area of concern is matched as the chat topic for the first terminal and the second terminal, and the determined chat topic is a topic in the common area of concern of the two parties. For example, by matching the user characteristic information of the first terminal and the second terminal, the common area of concern of the first terminal and the second terminal is determined to be fishing, and then the topic related to fishing is matched as the chat topic for the first terminal and the second terminal. In this way, the interest for the chatting is increased for both parties to facilitate continuation of the chat.

In some embodiments, the user characteristic information is the chat history of the terminal, and determining the common area of concern of the first terminal and the second terminal includes: determining, by the server, the topics that the first terminal has talked about in the chat history according to the chat history of the first terminal, thereby determining the area of concern of the first terminal; determining, by the server, the topics that the second terminal has talked about in the chat history according to the chat history of the second terminal, thereby determining the area of concern of the second terminal; and matching, by the server, the topics that the first terminal has talked about with the topics that the second terminal has talked about, thereby determining a common area of concern of the first terminal and the second terminal. The chat history of the first terminal is a chat history of the first terminal and any terminal, and the chat history of the second terminal is a chat history of the second terminal and any terminal.

In some embodiments, when determining a topic related to the common area of concern, since the first terminal and the second terminal are not chatting for the first time, the server also needs to determine whether the determined topic is the topic that the first terminal and the second terminal have talked about before. If the determined topic is not the topic that the first terminal and the second terminal have talked about before, the determined topic is used as the chat topic for the first terminal and the second terminal, and if the determined topic is the topic that the first terminal and the second terminal have talked about before, the determined topic is not used as the chat topic for the first terminal and the second terminal. Alternatively, the determined topic is used as the chat topic for the first terminal and the second terminal, but when determining the first question according to the chat topic, the determined first question needs to be a question that has not been talked about before.

In some embodiments, determining the chat topic for the first terminal and the second terminal according to the user characteristic information of the second terminal includes:

determining an area of concern of the second terminal according to the user characteristic information of the second terminal; and matching a topic related to the area of the concern as the chat topic for the first terminal and the second terminal, that is, generating the chat topic for the first terminal and the second terminal according to the area of concern.

The topic is a topic pre-stored in a question library, or a topic composed and saved in advance by the first terminal, or a set of topics in the question library and topics composed by user terminals. The area of concern is the category of topics of concern.

The server acquires the user characteristic information of the second terminal, determines the area of concern of the second terminal according to the user characteristic information of the second terminal, and matches the topic related to the area of concern as the chat topic for the first terminal and the second terminal. For example, if the second terminal is located in Hangzhou, the area of concern of the second terminal is determined to be Hangzhou, Hangzhou tourism, Hangzhou cuisine, etc., and therefore, topics related to Hangzhou, Hangzhou tourism or Hangzhou cuisine are matched as the chat topic for the first terminal and the second terminal.

In some embodiments, determining the first question and the corresponding options for the first terminal according to the chat topic, and sending the first question and the corresponding options to the first terminal and the second terminal include:

upon receipt of a topic start request from the first terminal, randomly selecting one start question and corresponding options from the chat topic as a question and corresponding options for the first terminal respectively, and sending the question and the corresponding options to the first terminal and the second terminal; or according to a second question and corresponding options received from the second terminal, acquiring a first question selected by the first terminal from the received options, matching corresponding options, and sending the first question selected by the first terminal and the matched options to the second terminal.

In response to receiving the topic start request from the first terminal, the server determines that a terminal initiating the topic start request is the first terminal, and determines the first question and the first question options, wherein the first question is a start question that is randomly selected from the chat topic, and the first question options are options that are matched with the first question. The server sends the first question and the first question options for the first terminal to the first terminal. The question for the first terminal is displayed on a display page of the first terminal in a sent-out form of the chat message, and the first question options are displayed in a location corresponding to the location where the first question is displayed, such that the first terminal learns about the first question options. At the same time, the first question and the first question options for the first terminal are sent to the second terminal, the first question for the first terminal is displayed on a display page of the second terminal in a received form of the chat message, and the first question options are displayed in a location corresponding to the location where the first question is displayed, such that the user of the second terminal selects a favorite first question option according to the first question and send the favorite first question option to the first terminal. Alternatively, instead of selecting from the first question options, the second terminal composes a chat message by itself.

In some embodiments, the second terminal as a sender of the chat message sends a second question and second question options to the first terminal, and the first terminal as a receiver of the chat message receives the second question and the second question options. And then the first terminal as the sender of the chat message sends a first question to the second terminal in response to the chat message sent by the second terminal. The second question options are options corresponding to the second question, and the second question options are also different questions. For example, the question sent by the second terminal is "What do you want to ask", and the second question options include "Have you eaten?" and "What did you eat at noon?"

In response to receiving by the first terminal the second question and the second question options from the second terminal, the server determines the first question and the first question options, wherein the first question options are questions that are selected by the first terminal from the received second question options, and the first question options are options that are matched with the first question. The selected question is displayed on a display page of the first terminal in the sent-out form of the chat message and transmitted to a server via a network. The server matches corresponding question options to the question selected by the first terminal, uses the question selected by the first terminal and the matched options as the first question and the first question options for the first terminal, and sends the first question options to the first terminal. The first question options are displayed on the display page of the first terminal in a location corresponding to the location where the first question is displayed. At the same time, the server sends the first question and the first question options for the first terminal to the second terminal. The first question for the first terminal is displayed on a display page of the second terminal in a received form of the chat message, and the first question options are displayed in a location corresponding to the location where the first question is displayed, such that the user of the second terminal selects the favorite first question option according to the first question and send the favorite first question option to the first terminal. Alternatively, instead of selecting from the first question options, the second terminal composes a chat message by itself.

In some embodiments, when the server sends the first question and the first question options to the first terminal and the second terminal, the server also needs to send a sending instruction to the first terminal and the second terminal, and the sending instruction indicates that the first terminal is the sending terminal of the first question and the first question options, and the second terminal is the receiving terminal of the first question and the first question options, so that after the first terminal and the second terminal receive the sending instruction, the first question is displayed on the chat page of the first terminal with the second terminal in the sent-out form of the chat message, and so that when the second terminal receives the sending instruction, the server can determine that the first question and the first question options are sent by the first terminal, so that the first question is displayed on the chat page of the second terminal with the first terminal in the received form of the chat message.

If the first question sent by the first terminal is a question composed by the user, the server can match first question options to the first question, send the first question options to the first terminal, and send the first question and the first question options to the second terminal.

In some embodiments, after determining the chat topic, the server sends a plurality of questions corresponding to the chat topic to the first terminal, and the plurality of questions is displayed on the first terminal. The user can select one question from the plurality of questions to send to the server, the server sends the options corresponding to the question to the first terminal, and sends the question and the corresponding options to the second terminal.

It should be noted that the first question and the first question options in the above embodiment are any question and the corresponding options in one chat session.

In some embodiments, the method for processing information further includes:

acquiring a source message of a chat initiator and sending the acquired source message to the other party when the first terminal or the second terminal serves as the chat initiator to initiate a chat session.

The other party refers to a chat receiver.

If the chat session is the first chat between the first terminal and the second terminal, the first terminal or the second terminal serves as the chat initiator, that is, the first terminal serves as the chat initiator and the second terminal serves as the chat receiver, or the first terminal serves as the chat receiver and the second terminal serves as the chat initiator. If the chat initiator initiates a chat session to the chat receiver (e.g., one chat session may be set up if the chat initiator says hello to the other party), the server acquires a source message of the chat initiator and sends the acquired source message to the chat receiver, such that the source message of the chat initiator is displayed on a display page of the chat receiver.

It should be noted that the present embodiment only described by taking the first terminal sending the chat message to the second terminal as an example. In another embodiment, the second terminal sends the chat message to the first terminal, the implementation manner of which is similar to that of the above embodiment, and is not repeated here.

Figure 3:
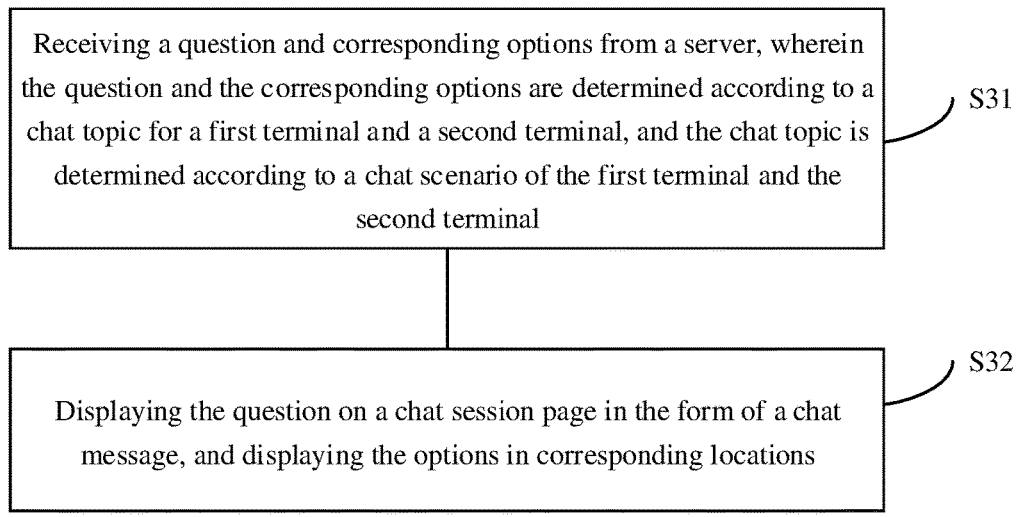
FIG. 3 is a flowchart of a method for processing information according to another embodiment of the present disclosure.

FIG. 3 is a flowchart of a method for processing information according to an embodiment of the present disclosure. As shown in FIG. 3, the method for processing information is applied to a terminal, and includes steps S31-S32.

In S31, a question and corresponding options are received from a server, wherein the question and the corresponding options are determined according to a chat topic for a first terminal and a second terminal, and the chat topic is determined according to a chat scenario of the first terminal and the second terminal.

In some embodiments, the question from the server is a first question and the terminal for performing the method for processing information includes the first terminal. The first terminal is an initiator of the question in a chat session, or a receiver of the question. The first terminal and a second terminal are two parties of the chat session, and the chat session is a two-person session or a group chat session. The second terminal is a user who is to receive a chat message from the first terminal, and the second terminal is also one terminal used by one user, or multiple terminals used by multiple users in the group chat session.

In some embodiments, the chat scenario is determined according to the frequency of chats between the first terminal and the second terminal, for example, according to whether the first terminal and the second terminal are chatting for the first time. The chat scenario is classified into a first chat and a non-first chat; alternatively, the chat scenario is determined in other ways, for example, according to the location of the first terminal or the second terminal.

First, the server determines the chat topic for the first terminal and the second terminal according to the chat scenario of the first terminal and the second terminal, determines the first question and the first question options for the first terminal according to the chat topic, and then sends the first question and the first question options for the first terminal to the first terminal and the second terminal. See the above exemplary embodiment of the present disclosure for details of the implementation manner for determining by the server the first question and the first question options, which is not repeated herein. It should be noted that objects referred to by the first terminal and the second terminal in the present embodiment and the above example embodiment of the present disclosure may be the same or different.

In S32, the question is displayed on a chat session page in the form of a chat message, and the options are displayed in corresponding locations.

The chat message is in a sent-out form or a received form, and its specific form is determined according to the identity of the first terminal.

The first question is displayed on the chat session page in the sent-out form of the chat message and the first question options are displayed in corresponding locations if the first terminal is an initiator of the question. The question is displayed on the chat session page in a received form of the chat message and the first question options are displayed in corresponding locations if the first terminal is a receiver of the question, and at this time, the user can select one first question option, the first terminal detects the first question option selected by the user, and sends the first question option to the server, and the server acquires the first question option sent by the first terminal and returns the acquired first question option to the second terminal.

In some embodiments, the method for processing information further includes:

receiving a source message of a chat initiator from the server, and displaying the source message.

In some embodiment, the first terminal is a chat invitee. The first terminal also receives the source message of the chat initiator from the server if the first terminal is the chat invitee. At this time, the source message of the chat initiator is displayed on the chat session page, and the source message of the chat initiator is displayed below or above a say hello message initiated by the chat initiator. For example, if the chat initiator finds the first terminal on a discover page and sends a chat message to the first terminal, a chat page of the first terminal displays: "The other party found you through the discover page and initiated a chat with you". In this way, the first terminal can quickly know where the other party is from and make an initial decision about the other party.

In other embodiments, the first terminal is a chat initiator. The first terminal finds the second terminal in any way if the first terminal is the chat initiator (that is, the second terminal is a chat invitee), opens the chat page with the second terminal, and sends a session establishment request to the server. The session establishment request may include information of the first terminal, information of the second terminal, and source message. After receiving the session establishment request, the server can determine how the first terminal finds the second terminal, and send the first question and the first question options for the first terminal to the second terminal, and at the same time sends the source message to the second terminal.

In some embodiments, before receiving the question and the corresponding options from the server, the method further includes:

sending a topic start request to the server upon detecting a trigger operation on the topic start button.

In this embodiment, the first terminal is a chat initiator or a chat invitee.

The topic start button is disposed on the chat session page of the first terminal if the first terminal is the chat initiator. A topic start request is sent to the server upon detecting the trigger operation on the topic start button of the first terminal, such that the server can determine the chat topic for two parties and determine the first question and the first question options for the first terminal. The topic start request may include information of the first terminal and information of the second terminal, such that the server can determine which terminal the two parties are respectively upon receiving the topic start request.

It should be noted that the above embodiment only described by taking the first terminal being the chat initiator and the second terminal being the chat receiver as an example. In another embodiment, the second terminal is the chat initiator and the first terminal is the chat receiver, the implementation manner of which is similar to that of the above embodiment, and is not repeated here.

Figure 4:
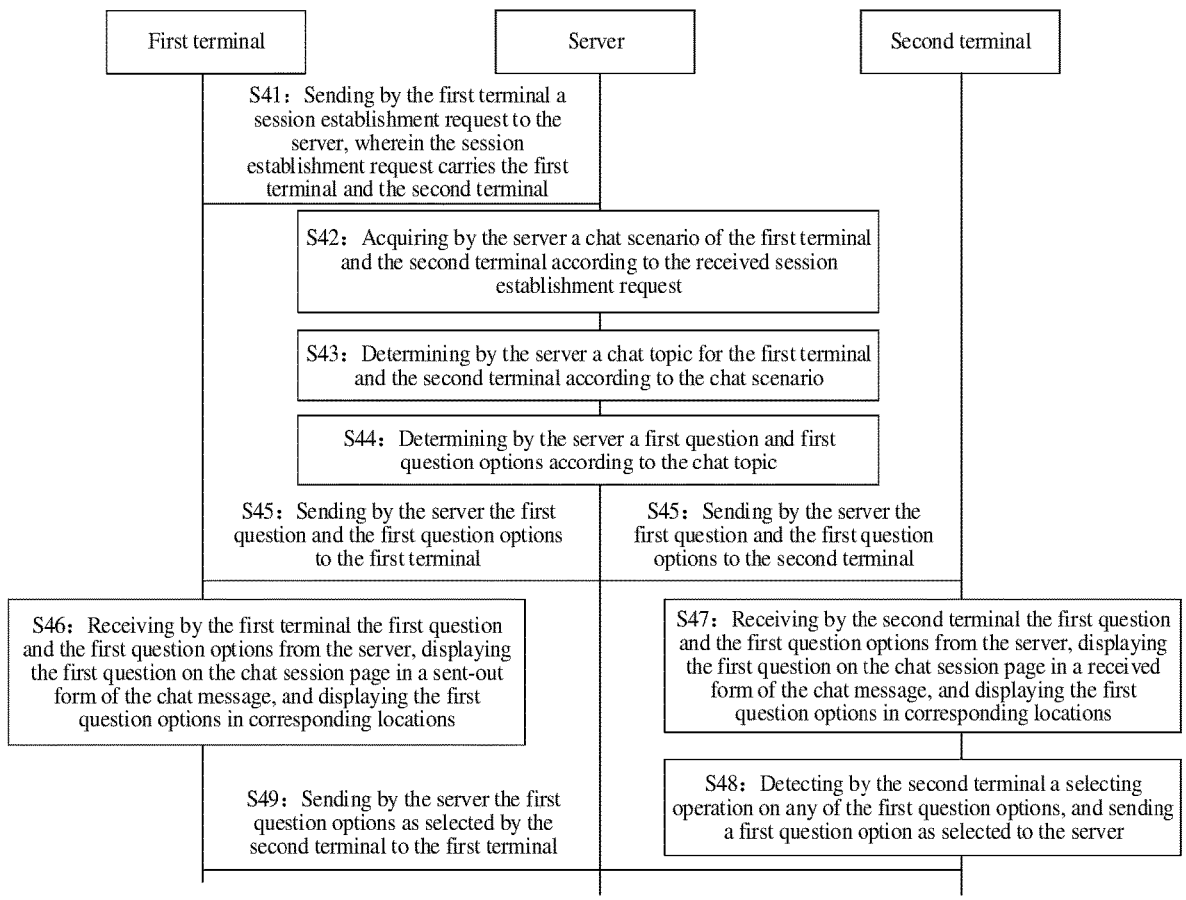
FIG. 4 is a flowchart of a method for processing information according to still another embodiment of the present disclosure.

FIG. 4 is a flowchart of a method for processing information according to still another embodiment of the present disclosure. As shown in FIG. 4, the interactive subjects of the method for processing information includes a first terminal, a second terminal and a server. The method for processing information includes steps S41-S49.

In S41, the first terminal sends a session establishment request to the server, wherein the session establishment request may include information of the first terminal and information of the second terminal.

In S42, the server acquires a chat scenario of the first terminal and the second terminal according to the received session establishment request.

In S43, the server determines a chat topic for the first terminal and the second terminal according to the chat scenario.

In S44, the server determines a first question and first question options according to the chat topic.

In S45, the server sends the first question and the first question options to the first terminal and the second terminal.

In S46, the first terminal receives the first question and the first question options from the server, displays the first question on the chat session page in a sent-out form of the chat message, and displays the first question options in corresponding locations.

In S47, the second terminal receives the first question and the first question options from the server, displays the first question on the chat session page in a received form of the chat message, and displays the first question options in corresponding locations.

In S48, the second terminal detects a selecting operation on any of the first question options, and sends a first question option as selected to the server.

In S49, the server sends the first question option as selected by the second terminal to the first terminal.

In some embodiments, the first question options are questions, the server matches corresponding options to the question after receiving the question from the second terminal, the server sends the matched options to the second terminal, and sends the question and the matched options to the first terminal.

The implementation manner of the embodiment shown in FIG. 4 is similar to that of the embodiments shown in FIGS. 2 and 3, and is not repeated here.

Figure 5:
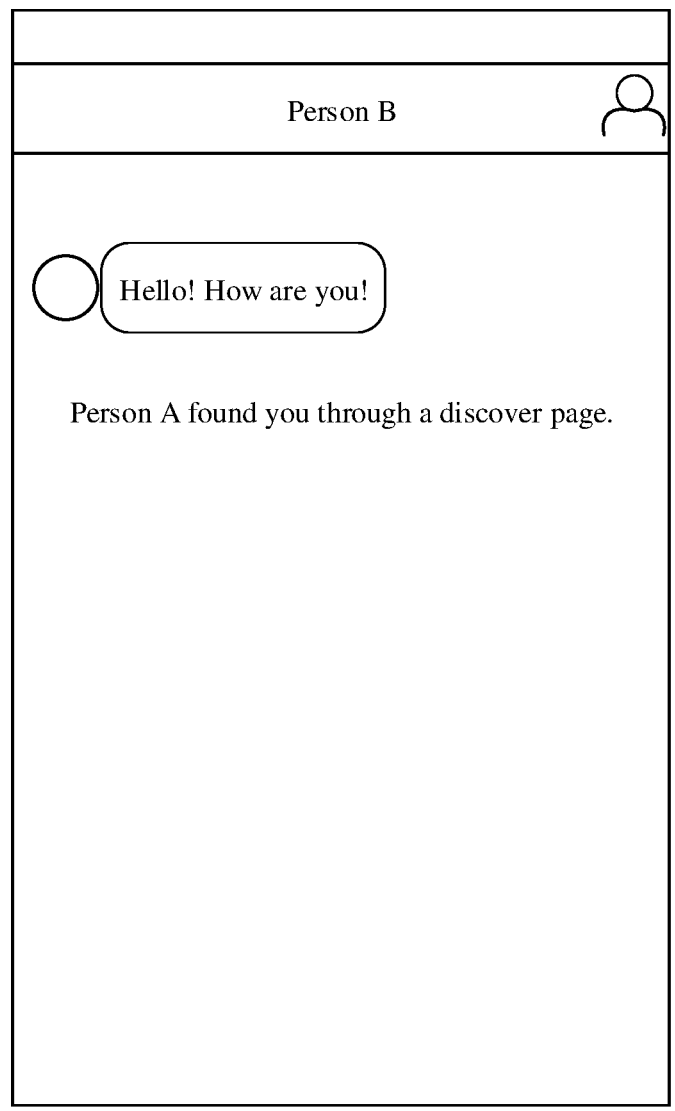
FIG. 5 is a schematic diagram showing that a chat session page of a chat invitee displays a source message of a chat initiator in a method for processing information according to an embodiment of the present disclosure.

The following example illustrated in FIG. 5 to FIG. 7B is taken to illustrate the technical solution of the embodiments of the present disclosure. This example takes a chat between person A using a first terminal and person B using a second terminal as an example. Person A initiates a chat session with person B, i.e., Person A is the chat initiator and person B is the chat invitee. After acquiring a source message of person A, the server sends the acquired source message to person B or the second terminal, and a chat session page of person B displays the source message of person A. As shown in FIG. 5, the second terminal displays the source message "Person A found you on discover page".

Figure 6A:
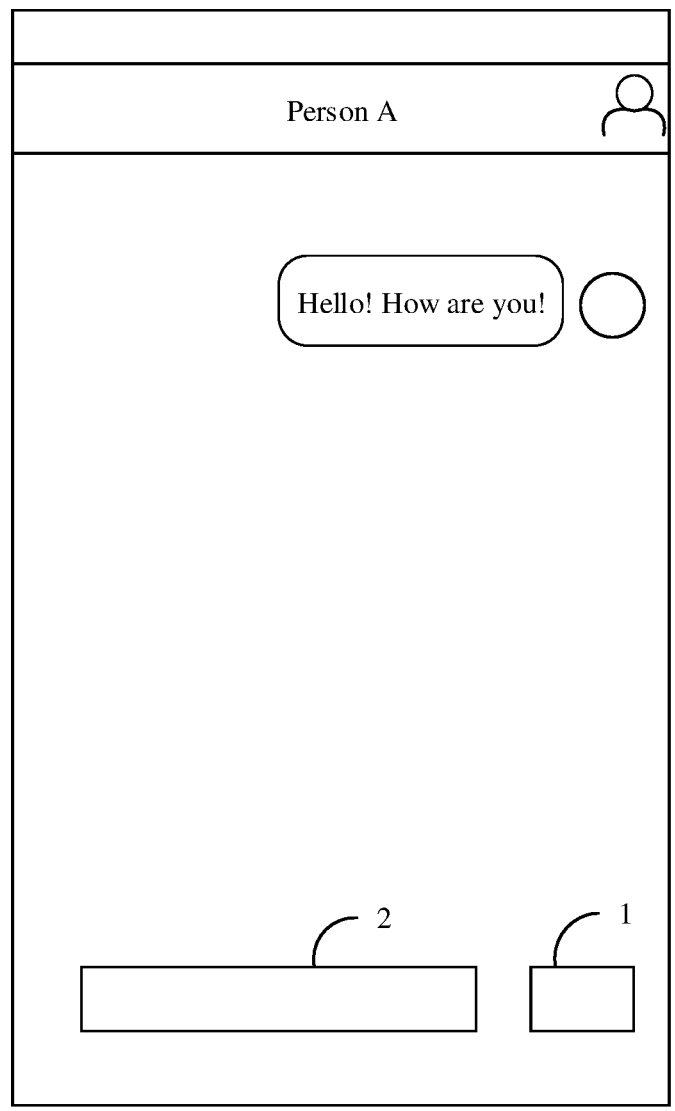
FIG. 6A is a schematic diagram showing that a topic start button is disposed on a chat session page in a method for processing information according to an embodiment of the present disclosure.
Figure 6B:
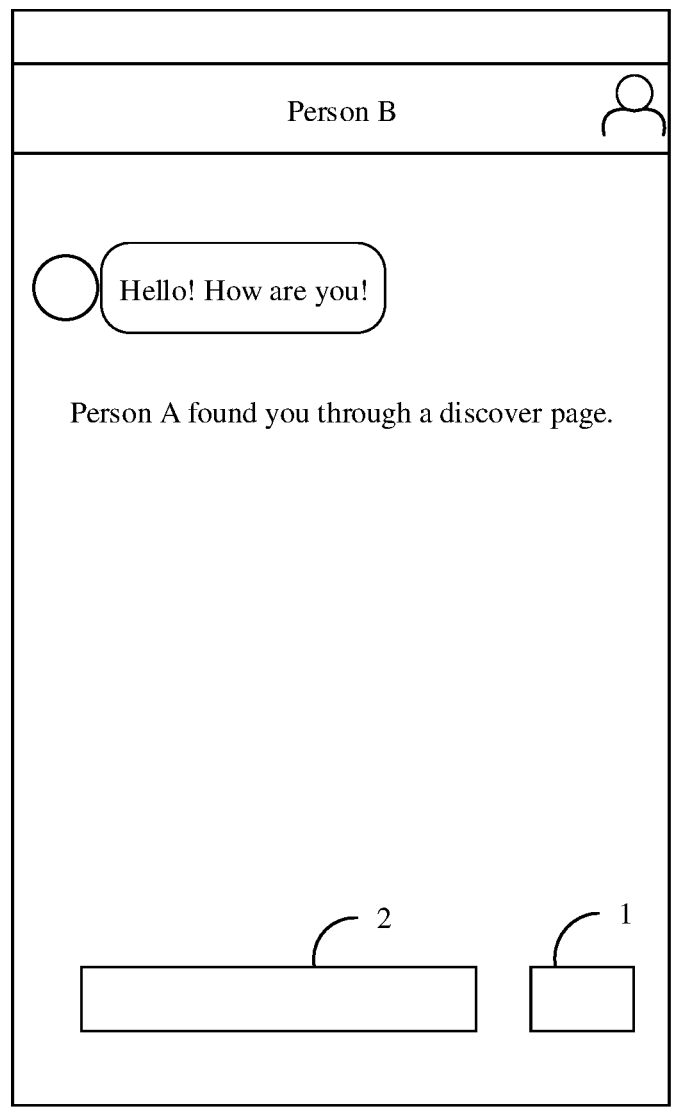
FIG. 6B is a schematic diagram showing that a topic start button is disposed on a chat session page in a method for processing information according to an embodiment of the present disclosure.

FIG. 6A is a schematic diagram of the chat session page of person A, and FIG. 6B is a schematic diagram of chat session page of person B. Topic start buttons are disposed on chat session pages of person A and person B, as shown in FIGS. 6A and 6B. In the illustrated example, the topic start button 1 is located on the right side of a message input box 2. Both person A and person B may initiate a question to the other party by tapping the topic start buttons.

Figure 7A:
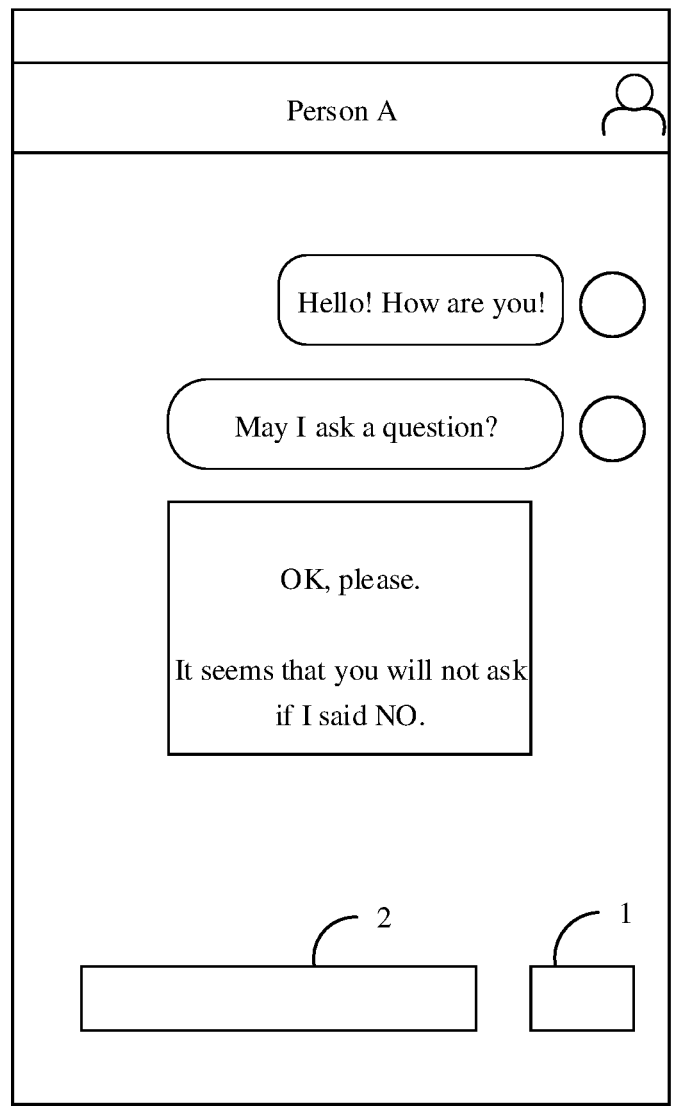
FIG. 7A is a schematic diagram showing that a question and options are displayed on a chat session page in a method for processing information according to an embodiment of the present disclosure.
Figure 7B:
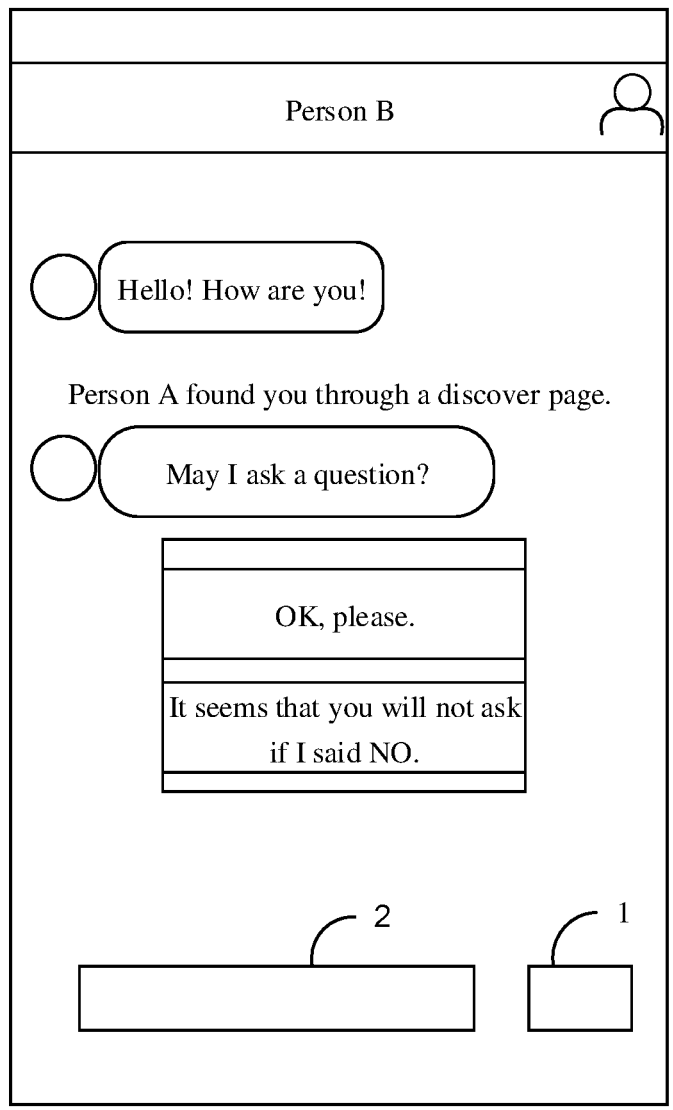
FIG. 7B is a schematic diagram showing that a question and options are displayed on a chat session page in a method for processing information according to another embodiment of the present disclosure.

FIG. 7A is a schematic diagram showing that a chat session page of person A displays the question and the question options for person A and FIG. 7B is a schematic diagram showing that a chat session page of person B displays the question and the options for person A. In the illustrated example, when person A taps the topic start button of the first terminal, a topic start request is sent to the server. The server acquires a question and corresponding question options for person A via topic matching, and sends them to person A (e.g., the first terminal) and person B (e.g., the second terminal) as shown in FIGS. 7A and 7B. As shown in FIG. 7A, the question "May I ask a question" is displayed in a sent-out form. FIG. 7A further shows the question options "OK, please" and "It seems that you will not ask if I said NO" are displayed on the location corresponding to the question.

As shown in FIG. 7B, the question "May I ask a question" is displayed in a received form. FIG. 7B further shows the question options "OK, please" and "It seems that you will not ask if I said NO" are displayed on the location corresponding to the question. Person B may select one of the options and send the selected option to person A via the server.

Figure 8:
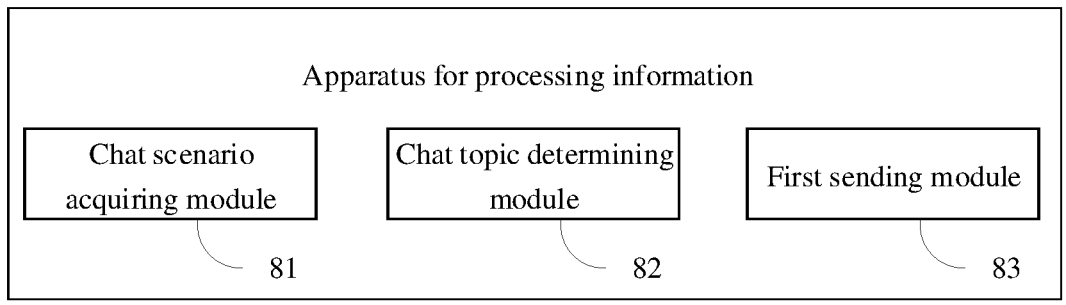
FIG. 8 is a structural block diagram of an apparatus for processing information according to an embodiment of the present disclosure.

FIG. 8 is a structural block diagram of an apparatus for processing information according to an embodiment of the present disclosure. Referring to FIG. 8, the apparatus includes a chat scenario acquiring module 81, a chat topic determining module 82, and a first sending module 83.

The chat scenario acquiring module 81 is configured to acquire a chat scenario of a first terminal and a second terminal.

The chat topic determining module 82 is configured to determine a chat topic for the first terminal and the second terminal according to the chat scenario.

The first sending module 83 is configured to determine a first question and first question options according to the chat topic, wherein the first question is sent by the first terminal to the second terminal.

The first sending module 83 is further configured to send the first question and the first question options to the first terminal and the second terminal, wherein the first question options are configured to be selected by the second terminal and are returned to the first terminal.

In some embodiments, the chat topic determining module 82 includes:

a first chat topic determining unit, configured to determine a chat topic for the first terminal and the second terminal as a start topic if the chat scenario is the first chat between the first terminal and the second terminal; and a second chat topic determining unit, configured to determine a chat topic for the first terminal and the second terminal according to user characteristic information of the second terminal if the chat scenario is not the first chat between the first terminal and the second terminal.

In some embodiments, the second chat topic determining unit includes:

a common-area-of-concern determining sub-unit, configured to determine a common area of concern of the first terminal and the second terminal according to the user characteristic information of the first terminal and the user characteristic information of the second terminal; and a first topic matching sub-unit, configured to generate a chat topic for the first terminal and the second terminal according to the common area of concern.

In some embodiments, the second chat topic determining unit includes:

an area-of-concern determining sub-unit, configured to determine an area of concern of the second terminal according to the user characteristic information of the second terminal; and a second topic matching sub-unit, configured to generate the chat topic for the first terminal and the second terminal according to the area of concern.

In some embodiments, the first sending module 83 includes:

a first sending unit, configured to, in response to receiving a topic start request from the first terminal, determine a first question and first question options, wherein the first question is a start question that is randomly selected from the chat topic.

In some embodiments, the first sending module 83 includes:

a second sending unit, configured to, in response to receiving by the first terminal a second question and second question options sent by the second terminal, determine a first question and first question options, wherein the first question is a question selected by the first terminal from the second question options, and the first question options are options that are matched with the first question.

In some embodiments, the apparatus further includes:

a second sending module, configured to acquire a source message of a chat initiator and to send the acquired source message to a chat receiver when the first terminal or the second terminal serves as the chat initiator to initiate a chat session.

With regard to the apparatus in the above embodiment of the present disclosure, the implementation manner in which the respective modules perform the operations has been described in detail in the embodiments of the method, and is not explained in detail herein.

Figure 9:
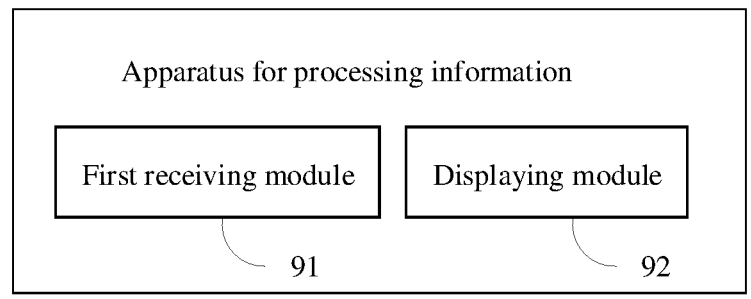
FIG. 9 is a structural block diagram of an apparatus for processing information according to another embodiment of the present disclosure.

FIG. 9 is a structural block diagram of an apparatus for processing information according to another embodiment of the present disclosure. Referring to FIG. 9, the apparatus includes a first receiving module 91 and a displaying module 92.

The first receiving module 91 is configured to receive a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal.

The displaying module 92 is configured to display the first question on a chat session page in the form of a chat message, and to display the first question options in corresponding locations, wherein the first question options are configured to be selected by the second terminal and returned to the first terminal.

In some embodiments, the apparatus further includes:

a sending module, configured to send a topic start request to the server upon detecting a trigger operation on a topic start button.

In some embodiments, the displaying module 92 includes:

a first display unit, configured to display the first question on the chat session page in a sent-out form of the chat message;

wherein the second terminal is configured to display the first question on the chat session page in a received form of the chat message, and further configured to send a selected first question option to the first terminal upon detecting a selecting operation on the first question options.

With regard to the apparatus in the above embodiment of the present disclosure, the implementation manner in which the respective modules perform the operations has been described in detail in the embodiments of the method, and is not explained in detail herein.

Figure 10:
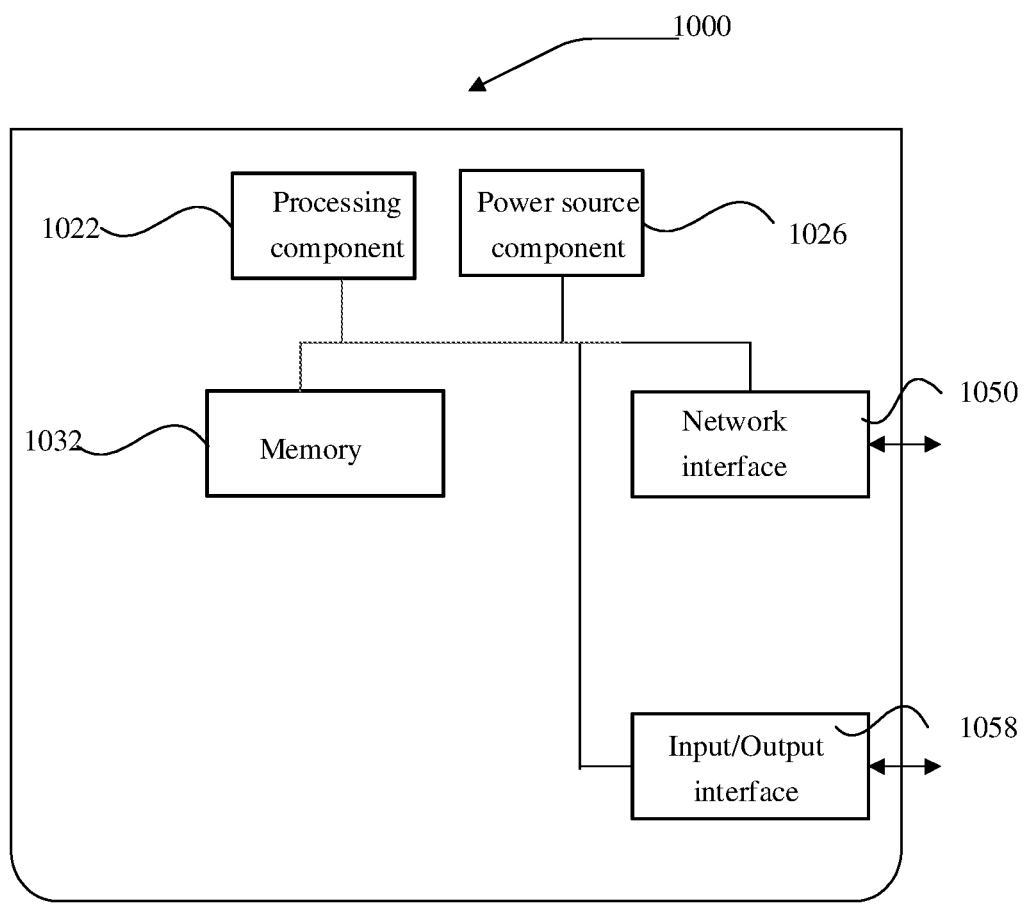
FIG. 10 is a structural block diagram of a server according to an embodiment of the present disclosure.

FIG. 10 is a structural block diagram of a server according to an embodiment of the present disclosure. Referring to FIG. 10, the server 1000 includes a processing component 1022 which further includes one or more processors, and memory resources represented by a memory 1032 for storing instructions executable by the processing component 1022, for example an application program. The application program stored in the memory 1032 includes one or more modules, each of which corresponds to a set of instructions. Further, the processing component 1022 is configured to:

acquire a chat scenario of a first terminal and a second terminal;

determine a chat topic for the first terminal and the second terminal according to the chat scenario; and determine a first question and first question options according to the chat topic, wherein the first question is sent by the first terminal to the second terminal; and send the first question and the first question options to the first terminal and the second terminal, wherein the first question options are configured to be selected by the second terminal and returned to the first terminal.

In some embodiments, the processing component 1022 is further configured to:

determine the chat topic for the first terminal and the second terminal as a start topic if the chat scenario is a first chat between the first terminal and the second terminal; and determine the chat topic for the first terminal and the second terminal according to user characteristic information of the second terminal if the chat scenario is not the first chat between the first terminal and the second terminal.

In some embodiments, the processing component 1022 is further configured to:

determine an area of concern of the second terminal according to the user characteristic information of the second terminal; and generate the chat topic for the first terminal and the second terminal according to the area of concern.

In some embodiments, the processing component 1022 is further configured to:

determine a common area of concern of the first terminal and the second terminal according to the user characteristic information of the first terminal and the user characteristic information of the second terminal; and generate the chat topic for the first terminal and the second terminal according to the common area of concern.

In some embodiments, the processing component 1022 is further configured to:

determine a first question and first question options in response to receiving a topic start request from the first terminal, wherein the first question is a start question that is randomly selected from the chat topic.

In some embodiments, the processing component 1022 is further configured to:

determine a first question and first question options in response to receiving by the first terminal a second question and second question options sent by the second terminal, wherein the first question is a question selected by the first terminal from the second question options, and the first question options are options that are matched with the first question.

In some embodiments, the processing component 1022 is further configured to:

acquiring a source message of a chat initiator and sending the source message to a chat receiver if the first terminal or the second terminal serves as the chat initiator to initiate a chat session.

The server 1000 may also include a power source component 1026 configured to perform power source management of the server 1000, a wired or wireless network interface 1050 configured to connect the server 1000 to the network, and an input/output (I/O) interface 1058. The server 1000 is operable to an operating system stored in the memory 1032, such as Windows Server™, Mac OS X™, Unix™, Linux™, FreeBSD™ or the like.

Figure 11:
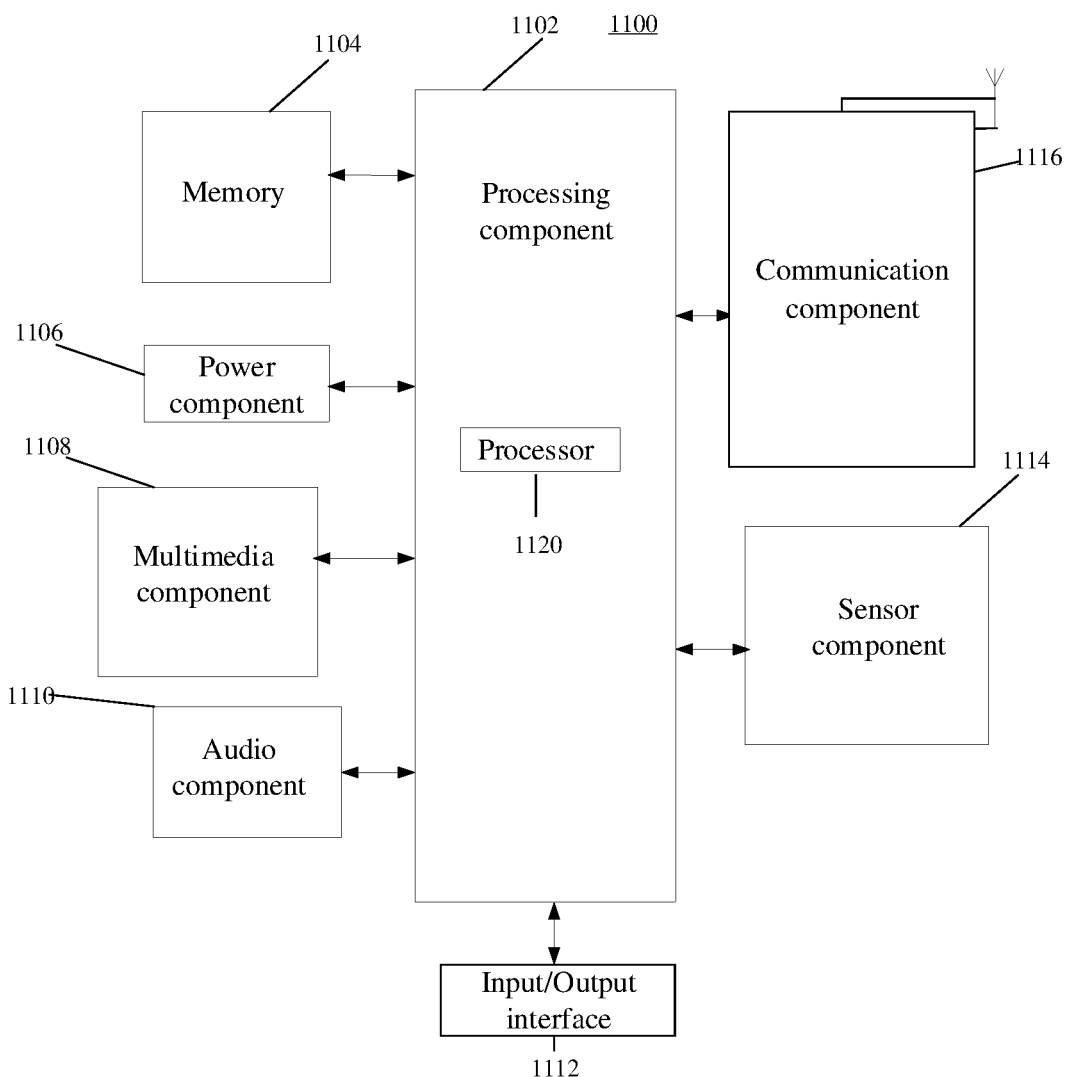
FIG. 11 is a structural block diagram of a terminal according to an embodiment of the present disclosure.

FIG. 11 is a structural block diagram of a terminal according to an embodiment of the present disclosure. For example, the terminal 1100 may be a mobile phone, a computer, a digital broadcast terminal, a message transceiver device, a game console, a tablet device, a medical device, a fitness device, a personal digital assistant, or the like.

Referring to FIG. 11, the terminal 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the terminal 1100, such as the operations associated with display, telephone calls, data communications, camera operations, and recording operations. The processing component 1102 includes one or more processors 1120 to execute instructions to perform all or part of the steps in the above-described methods. Moreover, the processing component 1102 includes one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the terminal 1100. Examples of such data include instructions for any applications or methods operable on the terminal 1100, contact data, phonebook data, messages, pictures, video, etc. The memory 1104 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the terminal 1100. The power component 1106 includes a power management system, one or more power sources, and any other components associated with the generation, management, and distribution of power in the terminal 1100.

The multimedia component 1108 includes a screen providing an output interface between the terminal 1100 and the user. In some embodiments, the screen includes a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors not only sense a boundary of a touch or swipe action, but also sense a period of time and a pressure associated with the touch or swipe action. In some embodiments, the multimedia component 1108 includes a front camera and/or a rear camera. The front camera and the rear camera receive an external multimedia datum while the terminal 1100 is in an operation mode, such as a photographing mode or a video mode. Each of the front camera and the rear camera is a fixed optical lens system or have focus and optical zoom capability.

The audio component 1110 is configured to output and/or input audio signals. For example, the audio component 1110 includes a microphone ("MIC") configured to receive an external audio signal if the terminal 1100 is in an operation mode, such as a call mode, a recording mode, and a voice recognition mode. The received audio signal is further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the terminal 1100. For instance, the sensor component 1114 detects an open/closed status of the terminal 1100, relative positioning of components, e.g., the display and the keypad, of the terminal 1100. The sensor component 1114 further detects a change in position of the terminal 1100 or a component of the terminal 1100, a presence or absence of user contact with the terminal 1100, an orientation or an acceleration/deceleration of the terminal 1100, and a change in temperature of the terminal 1100. The sensor component 1114 includes a proximity sensor configured to detect the presence of nearby objects without any physical contact. The sensor component 1114 also includes a light sensor, such as a complementary metal oxide semiconductor (CMOS) or charge-coupled device (CCD) image sensor, for use in imaging applications. In some embodiments, the sensor component 1114 also includes an accelerometer sensor, a gyroscope sensor, a magnetic sensor, a pressure sensor, or a temperature sensor.

The communication component 1116 is configured to facilitate communication, wired or wirelessly, between the terminal 1100 and other devices. The terminal 1100 accesses a wireless network based on a communication standard, such as WiFi, 2G, 3G, 4G or 5G or a combination thereof.

In one exemplary embodiment, the communication component 1116 receives a broadcast signal or broadcast associated information from an external broadcast management system via a broadcast channel In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In the disclosed embodiments, the terminal 1100 is implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements. The terminal 1100 includes: a processor 1120, and a memory configured to store an instruction executable by the processor. The processor 1120 is configured to:

receive a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal; and display the first question on a chat session page in the form of a chat message, and display the first question options in corresponding locations, wherein the first question options are configured to be selected by the second terminal and returned to the first terminal.

In some embodiments, the processor 1120 is further configured to:

send a topic start request to the server upon detecting a trigger operation on a topic start button.

In some embodiments, the processor 1120 is further configured to:

display the first question on the chat session page in a sent-out form of the chat message;

wherein the second terminal is configured to display the first question on the chat session page in a received form of the chat message, and further configured to send a selected first question option to the first terminal upon detecting a selecting operation on the first question options.

In some embodiments of the present disclosure, a non-transitory computer readable storage medium including instructions, such as the memory 1104 including instructions, is provided. The above instructions, when being executed by a processor 1120 of a terminal 1100, enable the processor 1120 to implement the following steps:

receiving a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal; and displaying the first question on a chat session page in the form of a chat message, and displaying the first question options in corresponding locations, wherein the first question options are configured to be selected by the second terminal and returned to the first terminal.

In some embodiments, the processor 1120 is further enabled to implement the following steps:

sending a topic start request to the server upon detecting a trigger operation on a topic start button.

In some embodiments, the processor 1120 is further enabled to implement the following steps:

displaying the first question on the chat session page in a sent-out form of the chat message;

wherein the second terminal is configured to display the first question on the chat session page in a received form of the chat message, and further configured to send a selected first question option to the first terminal upon detecting a selecting operation on the first question options.

In some embodiments, if the terminal is the second terminal, the processor 1120 is further enabled to implement the following steps:

sending a selected first question option to the first terminal upon detecting a selecting operation on the first question options.

For example, the non-transitory computer readable storage medium is a read-only memory (ROM), a random-access memory (RAM), a CD-ROM, a magnetic tape, a floppy disc, an optical data storage device, or the like.

In the disclosed embodiments, a non-transitory computer readable storage medium including instructions, such as the memory 1022 including instructions, is provided. The above instructions, when being executed by a processing component 1022 of a server 1000, enable the processing component 1022 to implement the following steps:

acquiring a chat scenario of a first terminal and a second terminal;

determining a chat topic for the first terminal and the second terminal according to the chat scenario; and determining a first question and first question options according to the chat topic, wherein the first question is sent by the first terminal to the second terminal; and sending the first question and the first question options to the first terminal and the second terminal, wherein the first question options are configured to be selected by the second terminal and returned to the first terminal.

In some embodiments, the processing component 1022 is enabled to implement the following steps:

determining the chat topic for the first terminal and the second terminal as a start topic if the chat scenario is a first chat between the first terminal and the second terminal; and determining the chat topic for the first terminal and the second terminal according to user characteristic information of the second terminal if the chat scenario is not the first chat between the first terminal and the second terminal.

In some embodiments, the processing component 1022 is enabled to implement the following steps:

determining an area of concern of the second terminal according to the user characteristic information of the second terminal; and generating the chat topic for the first terminal and the second terminal according to the area of concern.

In some embodiments, the processing component 1022 is enabled to implement the following steps:

determining a common area of concern of the first terminal and the second terminal according to the user characteristic information of the first terminal and the user characteristic information of the second terminal; and generating the chat topic for the first terminal and the second terminal according to the common area of concern.

In some embodiments, the processing component 1022 is enabled to implement the following steps:

determining a first question and first question options in response to receiving a topic start request from the first terminal, wherein the first question is a start question that is randomly selected from the chat topic.

In some embodiments, the processing component 1022 is enabled to implement the following steps:

determining a first question and first question options in response to receiving by the first terminal a second question and second question options sent by the second terminal, wherein the first question is a question selected by the first terminal from the second question options, and the first question options are options that are matched with the first question.

In some embodiments, the processing component 1022 is enabled to implement the following steps:

acquiring a source message of a chat initiator and sending the source message to a chat receiver when the first terminal or the second terminal serves as the chat initiator to initiate a chat session.

For example, the non-transitory computer readable storage medium is a read-only memory (ROM), a random-access memory (RAM), a CD-ROM, a magnetic tape, a floppy disc, an optical data storage device, or the like.

In the embodiments of the present disclosure, a computer program is provided, wherein the instructions of the computer program, when being executed by a processor of a terminal, enable the processor to implement the following steps:

receiving a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal; and displaying the first question on a chat session page in the form of a chat message, and displaying the first question options in corresponding locations, wherein the first question options are configured to be selected by the second terminal and returned to the first terminal.

In some embodiments, the instructions of the computer program, when being executed by a processor of a terminal, further enable the processor to implement the following steps:

sending a topic start request to the server upon detecting a trigger operation on a topic start button.

In some embodiments, the instructions of the computer program, when being executed by a processor of a terminal, further enable the processor to implement the following steps:

displaying the first question on the chat session page in a sent-out form of the chat message;

wherein the second terminal is configured to display the first question on the chat session page in a received form of the chat message, and further configured to send a selected first question option to the first terminal upon detecting a selecting operation on the first question options.

In the embodiments of the present disclosure, a computer program is further provided, wherein the instructions of the computer program, when being executed by a processor of a server, enable the processor to implement the following steps:

acquiring a chat scenario of a first terminal and a second terminal;

determining a chat topic for the first terminal and the second terminal according to the chat scenario; and determining a first question and first question options according to the chat topic, wherein the first question is sent by the first terminal to the second terminal; and sending the first question and the first question options to the first terminal and the second terminal, wherein the first question options are configured to be selected by the second terminal and returned to the first terminal.

In some embodiments, the instructions of the computer program, when being executed by a processor of a server, further enable the processor to implement the following steps:

determining the chat topic for the first terminal and the second terminal as a start topic if the chat scenario is a first chat between the first terminal and the second terminal; and determining the chat topic for the first terminal and the second terminal according to user characteristic information of the second terminal if the chat scenario is not the first chat between the first terminal and the second terminal.

In some embodiments, the instructions of the computer program, when being executed by a processor of a server, further enable the processor to implement the following steps:

determining an area of concern of the second terminal according to the user characteristic information of the second terminal; and generating the chat topic for the first terminal and the second terminal according to the area of concern.

In some embodiments, the instructions of the computer program, when being executed by a processor of a server, further enable the processor to implement the following steps:

determining a common area of concern of the first terminal and the second terminal according to the user characteristic information of the first terminal and the user characteristic information of the second terminal; and generating the chat topic for the first terminal and the second terminal according to the common area of concern.

In some embodiments, the instructions of the computer program, when being executed by a processor of a server, further enable the processor to implement the following steps:

determining a first question and first question options in response to receiving a topic start request from the first terminal, wherein the first question is a start question that is randomly selected from the chat topic.

In some embodiments, the instructions of the computer program, when being executed by a processor of a server, further enable the processor to implement the following steps:

determining a first question and first question options in response to receiving by the first terminal a second question and second question options sent by the second terminal, wherein the first question is a question selected by the first terminal from the second question options, and the first question options are options that are matched with the first question.

In some embodiments, the instructions of the computer program, when being executed by a processor of a server, further enable the processor to implement the following steps:

acquiring a source message of a chat initiator and sending the acquired source message to a chat receiver if the first terminal or the second terminal serves as the chat initiator to initiate a chat session.

According to the embodiments of the present disclosure, a method for processing information is provided. The method includes:

acquiring a chat scenario of a first terminal and a second terminal upon setup of a chat session between the first terminal and the second terminal;

determining a chat topic for the first terminal and the second terminal according to the chat scenario; and determining a first question and corresponding question options according to the chat topic, and sending the first question and the corresponding question options to the first terminal and the second terminal, wherein the corresponding question options are configured to be selected by the second terminal and returned to the first terminal.

In some embodiments, determining the chat topic for the first terminal and the second terminal according to the chat scenario includes:

determining the chat topic for the first terminal and the second terminal as a start topic if the chat scenario is a first chat between the first terminal and the second terminal; and determining the chat topic for the first terminal and the second terminal according to user characteristic information of the second terminal if the chat scenario is not the first chat between the first terminal and the second terminal.

In some embodiments, determining the chat topic for the first terminal and the second terminal according to the user characteristic information of the first terminal and the user characteristic information of the second terminal includes:

determining a common area of concern of the first terminal and the second terminal according to the user characteristic information of the first terminal and the user characteristic information of the second terminal; and matching the topic related to the common area of concern as a chat topic for the first terminal and the second terminal.

In some embodiments, determining the chat topic for the first terminal and the second terminal according to the user characteristic information of the second terminal includes:

determining an area of concern of the second terminal according to the user characteristic information of the second terminal; and matching the topic related to the common area of concern as a chat topic for the first terminal and the second terminal.

In some embodiments, determining a first question and corresponding question options according to the chat topic and sending the first question and corresponding question options to the first terminal and the second terminal includes:

upon receipt of a topic start request from the first terminal, randomly selecting one start question and corresponding question options from the chat topic as a question and corresponding question options for the first terminal respectively, and sending the question and the corresponding question options to the first terminal and the second terminal; or according to a second question and corresponding question options received from the second terminal, acquiring a first question selected by the first terminal from the received question options, matching corresponding question options, and sending the first question selected by the first terminal and the matched question options to the second terminal.

In some embodiments, the method for processing information further includes:

acquiring a source message of a chat initiator and sending the acquired source message to the other party when the first terminal or the second terminal serves as the chat initiator to initiate a chat session.

According to the embodiments of the present disclosure, a method for processing information is provided. The method includes:

receiving a question and corresponding question options from a server, wherein the question and the corresponding question options are determined according to a chat topic for a first terminal and a second terminal, and the chat topic is determined according to a chat scenario of the first terminal and the second terminal;

displaying the question on a chat session page in the form of a chat message, and displaying the question options in corresponding locations.

In some embodiments, the method for processing information further includes:

receiving a source message of a chat initiator from the server, and displaying the source message.

In some embodiments, before receiving the question and the corresponding question options from the server, the method further includes:

sending a topic start request to the server upon detecting a trigger operation on the topic start button.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for facilitating a chat between users of two terminals, applicable to a server, the method comprising:

acquiring a chat scenario of a first terminal and a second terminal;

determining a chat topic for the first terminal and the second terminal according to the chat scenario; and determining a first question and first question options according to the chat topic, wherein the first question is sent by the first terminal to the second terminal; and sending the first question and the first question options to the first terminal and the second terminal, wherein the first question options are configured to be selected by the second terminal and returned to the first terminal, wherein determining the chat topic for the first terminal and the second terminal according to the chat scenario comprises:

determining the chat topic for the first terminal and the second terminal as a start topic in the case that the chat scenario is a first chat between the first terminal and the second terminal, wherein the start topic is preset and configured to facilitate a conversation between unfamiliar parities; and determining the chat topic for the first terminal and the second terminal according to user characteristic information of the second terminal in the case that the chat scenario is not the first chat between the first terminal and the second terminal.

2. The method according to claim 1, wherein the chat scenario is acquired upon a setup of a chat session and wherein the chat session is a two-person chat session or the chat session is a group chat session and the first terminal and the second terminal are two parties of the chat session.

3. The method according to claim 1, wherein the chat scenario is determined according to a geographic location of the first terminal or a geographic location of the second terminal.

4. The method according to claim 1, wherein the user characteristic information includes a chat history of the first terminal or a chat history of the second terminal.

5. The method according to claim 1, wherein determining the chat topic for the first terminal and the second terminal according to the user characteristic information of the second terminal comprises:
determining an area of concern of the second terminal according to the user characteristic information of the second terminal; and
generating the chat topic for the first terminal and the second terminal according to the area of concern.

6. The method according to claim 1, wherein determining the chat topic for the first terminal and the second terminal according to the user characteristic information of the second terminal comprises:
determining a common area of concern of the first terminal and the second terminal according to the user characteristic information of the first terminal and the user characteristic information of the second terminal; and
generating the chat topic for the first terminal and the second terminal according to the common area of concern.

7. The method according to claim 1, wherein determining the first question and the first question options according to the chat topic comprises:
determining the first question and the first question options in response to receiving a topic start request from the first terminal, wherein the first question is a start question that is randomly selected from the chat topic.

8. The method according to claim 1, wherein determining the first question and the first question options according to the chat topic comprises:
determining the first question and the first question options in response to, receiving by the first terminal, a second question and second question options sent by the second terminal, wherein the first question is a question selected by the first terminal from the second question options, and the first question options are options matched to the first question.

9. The method according to claim 1, further comprising:
acquiring a source message of the first terminal; and
sending the source message to the second terminal.

10. The method according to claim 1, where the start topic comprises one of hometown, interest and hobby.

11. A method for facilitating a chat between users of two terminals, applied to a first terminal, the method comprising:
receiving a first question and first question options from a server, wherein the first question is sent by the first terminal to a second terminal, the first question and the first question options are determined according to a chat topic for the first terminal and the second terminal, and the chat topic is determined according to a chat scenario of the first terminal and the second terminal, wherein the chat topic for the first terminal and the second terminal is determined as a start topic in the case that the chat scenario is a first chat between the first terminal and the second terminal, and the start topic is preset and configured to facilitate a conversation between unfamiliar parities, and wherein the chat topic for the first terminal and the second terminal is determined according to user characteristic information of the second terminal in the case that the chat scenario is not the first chat between the first terminal and the second terminal; and
displaying the first question on a chat session page in the form of a chat message, and displaying the first question options in corresponding locations, wherein the first question options are configured to be selected by the second terminal and returned to the first terminal.

12. The method according to claim 11, wherein the chat scenario is acquired upon a setup of a chat session and wherein the chat session is a two-person chat session or the chat session is a group chat session and the first terminal and the second terminal are two parties of the chat session.

13. The method according to claim 11, wherein the method further comprises:
sending a topic start request to the server upon detecting a trigger operation on a topic start button on the first terminal.

14. The method according to claim 11, wherein displaying the first question on the chat session page in the form of the chat message, comprises:
displaying the first question on the chat session page in a sent-out form of the chat message.

15. The method according to claim 14, further comprising:
receiving a selected first question option from the second terminal, wherein the second terminal is adapted to display the first question on the chat session page in a received form of the chat message, and to send the selected first question option to the first terminal upon detecting a selecting operation on the first question options by a user.

16. A terminal, comprising:
a processor; and
a memory configured to store an instruction executable by the processor;
wherein the processor is configured to:
receive a first question and first question options from a server, wherein the first question is sent by a first terminal to a second terminal, the first question and the first question options are determined according to a chat topic for the first terminal and the second terminal, and the chat topic is determined according to a chat scenario of the first terminal and the second terminal, wherein the chat topic for the first terminal and the second terminal is determined as a start topic in the case that the chat scenario is a first chat between the first terminal and the second terminal, and the start topic is preset and configured to facilitate a conversation between unfamiliar parities, and wherein the chat topic for the first terminal and the second terminal is determined according to user characteristic information of the second terminal in the case that the chat scenario is not the first chat between the first terminal and the second terminal; and
display the first question on a chat session page in a form of a chat message, and display the first question options in corresponding locations, wherein the first question options are configured to be selected by the second terminal and returned to the first terminal.

17. The terminal according to claim 16, wherein the chat scenario is acquired upon a setup of a chat session and wherein the chat session is a two-person chat session or the chat session is a group chat session and the first terminal and the second terminal are two parties of the chat session.

18. The terminal according to claim 16, wherein the processer is further configured to:
   send a topic start request to the server upon detecting a trigger operation on a topic start button.

19. The terminal according to claim 16, wherein the processor is further configured to:
   display the first question on the chat session page in a sent-out form of the chat message;
   wherein the second terminal is configured to display the first question on the chat session page in a received form of the chat message, and further configured to send a selected first question option to the first terminal upon detecting a selecting operation on the first question options.

* * * * *